US008407485B2

(12) United States Patent
Ohta

(10) Patent No.: US 8,407,485 B2
(45) Date of Patent: Mar. 26, 2013

(54) INFORMATION UPDATING DEVICE AND INTEGRATED CIRCUIT THEREOF, INFORMATION UPDATING METHOD, AND RECORDING DEVICE AND INTEGRATED CIRCUIT THEREOF

(75) Inventor: Yu saku Ohta, Osaka (JP)

(73) Assignee: Panasonic Corporation, Osaka (JP)

( * ) Notice: Subject to any disclaimer, the term of this patent is extended or adjusted under 35 U.S.C. 154(b) by 337 days.

(21) Appl. No.: 12/811,746

(22) PCT Filed: Nov. 20, 2009

(86) PCT No.: PCT/JP2009/006263
§ 371 (c)(1),
(2), (4) Date: Jul. 6, 2010

(87) PCT Pub. No.: WO2010/061562
PCT Pub. Date: Jun. 3, 2010

(65) Prior Publication Data
US 2010/0281272 A1 Nov. 4, 2010

(30) Foreign Application Priority Data

Nov. 26, 2008 (JP) .................................. 2008-300484

(51) Int. Cl.
*H04L 29/06* (2006.01)
(52) U.S. Cl. ........................................... 713/190; 726/2
(58) Field of Classification Search .................. 713/182
See application file for complete search history.

(56) References Cited

U.S. PATENT DOCUMENTS

| | | | |
|---|---|---|---|
| 6,205,548 B1 | 3/2001 | Hasbun | |
| 2001/0011347 A1 | 8/2001 | Narayanaswamy et al. | |
| 2003/0140134 A1 | 7/2003 | Swanson et al. | |
| 2004/0162960 A1* | 8/2004 | Allison | 711/206 |
| 2006/0107071 A1 | 5/2006 | Girish et al. | |
| 2008/0086657 A1 | 4/2008 | Chen et al. | |

FOREIGN PATENT DOCUMENTS

| | | |
|---|---|---|
| JP | 5-158805 | 6/1993 |
| JP | 7-191890 | 7/1995 |
| JP | 2002-268955 | 9/2002 |
| WO | 00/07106 | 2/2000 |

OTHER PUBLICATIONS

OTHER PUBLICATIONS

Federal Information Processing Standards Publication 186 "Digital Signature Standard" May 19, 1994. pp. 1-17 from http://www.itl.nist.gov/fipspubs/fip186.htm.*
International Search Report issued Mar. 2, 2010 in International (PCT) Application No. PCT/JP2009/006263.
Supplementary European Search Report issued May 23, 2012 in corresponding European Patent Application No. EP 09 82 8812.9.

* cited by examiner

*Primary Examiner* — Hadi Armouche
*Assistant Examiner* — Lisa Lewis
(74) *Attorney, Agent, or Firm* — Wenderoth, Lind & Ponack, L.L.P.

(57) ABSTRACT

Provided is an information updating apparatus that suppresses performance deterioration due to switching between writable recording areas in which information elements are to be written and readable recording areas from which the information elements are to be read. Also, the information updating apparatus updates a plurality of information elements recorded in a non-volatile recording medium with robustness against power discontinuity ensured. In order to achieve such effects, two groups of recording areas that are identical in number are allocated in the recording medium. The information elements are written in either group of the recording areas indicated by judgment information as the writable recording areas. Each time all the information elements have been written, the judgment information is updated. Thus, the writable recording areas are switched between the two groups of the recording areas.

11 Claims, 10 Drawing Sheets

FIG. 3A

| Recording area | Page number | Area number |
|---|---|---|
| M(11) | 1 | 1 |
| M(12) | 1 | 2 |
| ⋮ | ⋮ | ⋮ |
| M(1N) | 1 | N |
| M(21) | 2 | 1 |
| M(22) | 2 | 2 |
| ⋮ | ⋮ | ⋮ |
| M(2N) | 2 | N |

FIG. 3B

| Page number | Start address |
|---|---|
| 1 | 0x01000000 |
| 2 | 0x02000000 |

FIG. 3C

| Area number | Start offset | Size |
|---|---|---|
| 1 | 0x00000000 | 8kB |
| 2 | 0x00100000 | 1MB |
| ⋮ | ⋮ | ⋮ |
| N | 0x00200000 | 128kB |

FIG. 3D

| Recording area | Start address | End address |
|---|---|---|
| M(11) | 0x01000000 | 0x01001fff |
| M(12) | 0x01100000 | 0x011fffff |
| ⋮ | ⋮ | ⋮ |
| M(1N) | 0x01200000 | 0x0121ffff |
| M(21) | 0x02000000 | 0x02001fff |
| M(22) | 0x02100000 | 0x021fffff |
| ⋮ | ⋮ | ⋮ |
| M(2N) | 0x02200000 | 0x0221ffff |

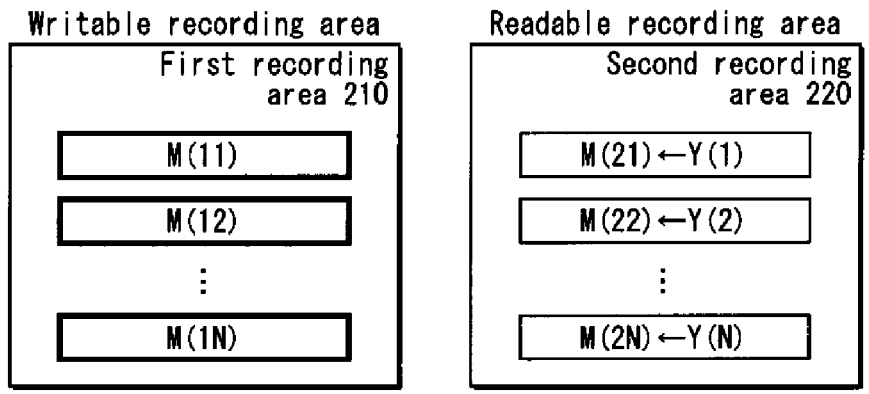
FIG. 6A D=0
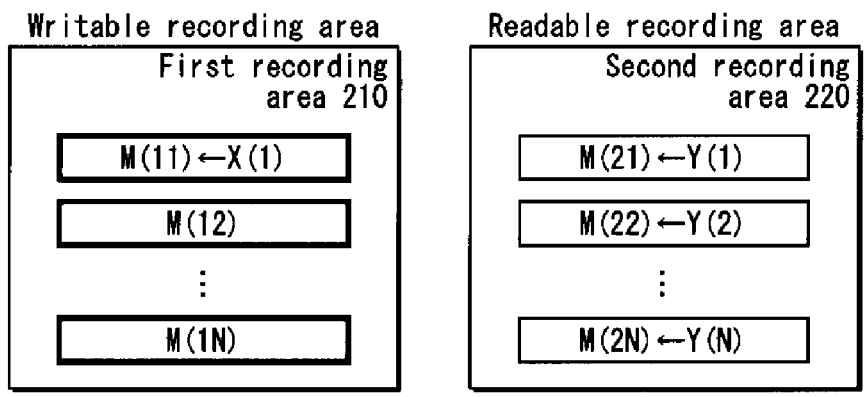
FIG. 6B D=0
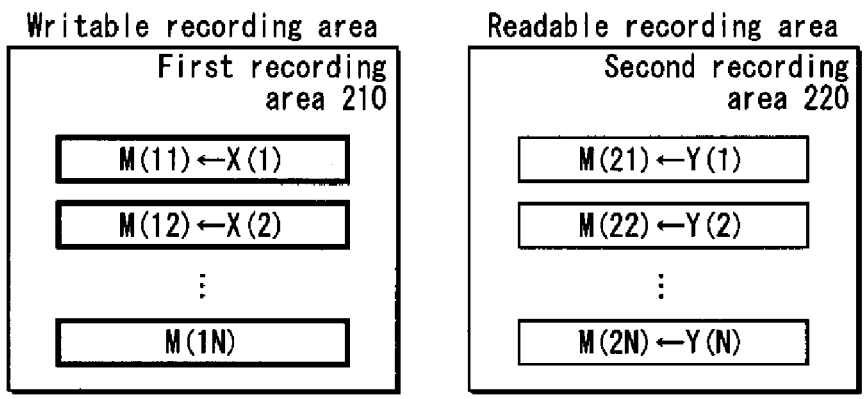
FIG. 6C D=0
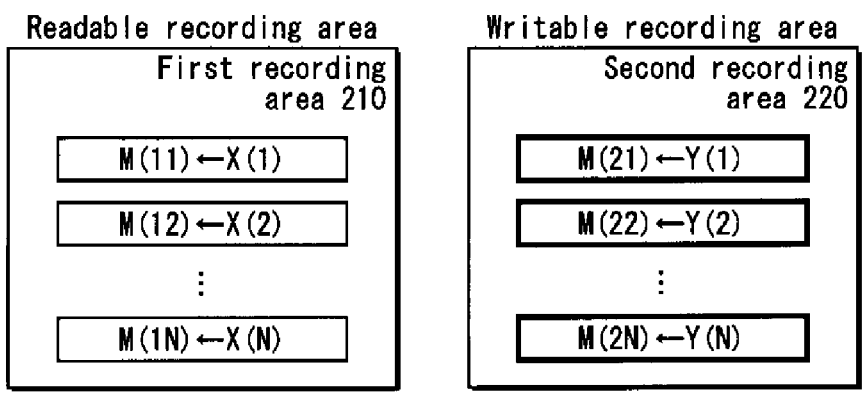
FIG. 6D D=1

INFORMATION UPDATING DEVICE AND INTEGRATED CIRCUIT THEREOF, INFORMATION UPDATING METHOD, AND RECORDING DEVICE AND INTEGRATED CIRCUIT THEREOF

TECHNICAL FIELD

The present invention relates to updating of information elements recorded in recording areas.

BACKGROUND ART

It is necessary to ensure robustness against power discontinuity when an information element recorded in a non-volatile recording medium is updated. Here, the information element is a unit expressing a group of information pieces. With the robustness against power discontinuity ensured, even when unpredictable power discontinuity occurs while the information element is being updated to a new information element, the information element before the update can be correctly read.

Patent literatures 1 and 2 each, for example, disclose the following method for updating an information element with such robustness ensured. That is, two recording areas are provided. One of the recording areas is set as a readable recording area, and the other one of the recording areas is set as a writable recording area. Here, the readable recording area is a recording area from which an information element is to be read, and the writable recording area is a recording area into which a new information element is to be written. After the new information element has been written into the writable recording area, the recording area set as the readable recording area and the other recording area set as the writable recording area are switched to be the writable recording area and the readable recording area, respectively.

According to this method, the information element recorded in the readable recording area is not changed while the new information element is being written into the writable recording area. Therefore, even if unpredictable power discontinuity occurs while the new information element is being written into the writable recording area, a normal information element can be read from the readable recording area after power has been restored.

CITATION LIST

Patent Literatures

[Patent Literature 1]
Japanese Patent Application Publication No. 05-158805
[Patent Literature 2]
Japanese Patent Application Publication No. 07-191890

SUMMARY OF INVENTION

Technical Problem

However, according to updating operations of an information element in conventional technology, the following problem arises. The writable recording area and the readable recording area are switched each time one information element has been written. Therefore, when there are a plurality of information elements to be updated, overheads for the switching relatively increase, which deteriorates information updating performance.

Also, the following problem arises when there is a relation among the plurality of information elements to be updated (e.g. when one piece of information is composed of a plurality of information elements). If unpredictable power discontinuity occurs while the information elements are sequentially written, the information elements before and after the update are mixed up and the relation thereamong is lost. Thus, after the power has been restored, normal processing cannot be performed due to unconformity among the information elements.

The present invention has been achieved in view of the above problems, and an aim thereof is to provide an information updating apparatus that updates a plurality of information elements recorded in a non-volatile recording medium while preventing deterioration in information updating performance and ensuring the robustness for preventing the power discontinuity. Here, the deterioration in information updating performance is caused due to switching between the writable and readable recording areas.

Solution to Problem

In order to solve the above problems, one aspect of the present invention is an information updating apparatus that updates information elements recorded in a non-volatile recording medium, the recording medium including two groups of recording areas that are identical in number, the information updating apparatus comprising: a write unit operable to write, on a one-to-one basis, information elements into either group of the recording areas indicated by judgment information, the judgment information indicating target recording areas into which the information elements are to be written; and an update unit operable to, each time the write unit completes writing of all information elements, update the judgment information to indicate the other group of the recording areas as the target recording areas.

Advantageous Effects of Invention

According to the update of a plurality of information elements recorded in the recording medium in the present invention, switching is performed between writable recording areas and readable recording areas by updating the judgment information. Such update of the judgment information is performed each time all the information elements have been written into the writable recording areas. Here, the writable recording areas are recording areas into which the information elements are to be written, and the readable recording areas are recording areas from which the information elements are to be read. Therefore, time necessary for the update can be shortened compared to the conventional technology. According to the conventional technology, switching is performed between the writable recording area and the readable recording area each time an information element is written.

Also, even when the information elements to be written into the recording areas are related to one another, it is possible to avoid a situation where only some of the information elements are updated and the remaining information elements are not updated.

The information updating apparatus may further comprise a read unit operable to read information elements from one of the two groups of recording areas that are not indicated as the target recording areas.

Thus, the information updating apparatus reads the information elements from the readable recording areas which are not writable recording areas. Therefore, even if unpredictable power discontinuity occurs while the write unit writes the information elements in the writable recording areas, the read unit can read all of the information elements before the update.

The information updating apparatus may further comprise a relation judgment unit operable to judge whether two or more of information elements are related to one another, wherein the update unit may perform the update only when the relation judgment unit judges positively Thus, the update unit switches between the writable recording areas and the readable recording areas only when the information elements recorded in the recording are related to one another. Therefore, the update unit does not update the judgment information when a plurality of invalid information elements that are not related to one another are received. Therefore, the read unit can read normal information elements before the update that are certainly related to one another.

The information updating apparatus may further comprise: an encryption unit operable to encrypt one or more of information elements to be written by the write unit; and a decryption unit operable to decrypt the encrypted one or more information elements that have been read by the read unit.

Thus, it is possible to increase confidentiality of the information elements by encrypting the information elements written into the recording areas and decrypting the encrypted information elements that have been read.

The information elements to be written by the write unit may include an encrypted program and a decryption key for decrypting the encrypted program, the encrypted program may include a digital signature for performing verification of the decryption key, the decryption unit may decrypt the encrypted program with use of the decryption key, and the relation judgment unit may judge positively only when the verification is successful.

Thus, the judgment as to whether the information elements are related to one another can be performed with use of known technology.

The recording medium may be a memory that is managed with use of a paging system, one of the two groups of recording areas may be allocated in a different page from a page in which the other one of the two groups of recording areas are allocated, the one group of the recording areas may be in one-to-one correspondence with the other group of the recording areas, and a start address of each of the one group of the recording areas and a start address of a corresponding one of the other group of the recording areas may have an identical offset from a page start address.

Thus, although the recording areas are allocated in different pages according to groups, a start address of each of the one group of the recording areas and a start address of a corresponding one of the other group of the recording areas have an identical offset from a page start address. Therefore, two different groups of the recording areas can share one address table that indicates start addresses of recording areas.

The write unit may perform the writing only when the relation judgment unit judges positively.

Thus, the judgment as to whether the information elements are related to one another is made before the information elements are written into the recording areas. Therefore, it is possible to avoid writing invalid information elements that are not related to one another.

BRIEF DESCRIPTION OF DRAWINGS

FIGS. 3A, 3B, 3C and 3D show address tables of recording areas allocated in a recording medium in the first embodiment;

FIGS. 6A, 6B, 6C and 6D show the information updating operations of the information updating apparatus in the first embodiment;

DESCRIPTION OF EMBODIMENTS

First Embodiment

A first embodiment describes an information updating apparatus that updates a group of N specific information elements from among various information elements recorded in a recording medium with the robustness against power discontinuity ensured. Here, N is a predetermined fixed value, and is a natural number equal to or larger than two. The group of N specific information elements is a group of information elements that are related to one another. When N=2, the group of the specific information elements is composed of an encrypted program and a decryption key for decrypting the encrypted program, for example. These information elements are related to one another since the encrypted program is decrypted with use of the decryption key. The group of specific information elements may be any kind of group as long as a group of useful data pieces are pre-set.

Structure

Figure 1:
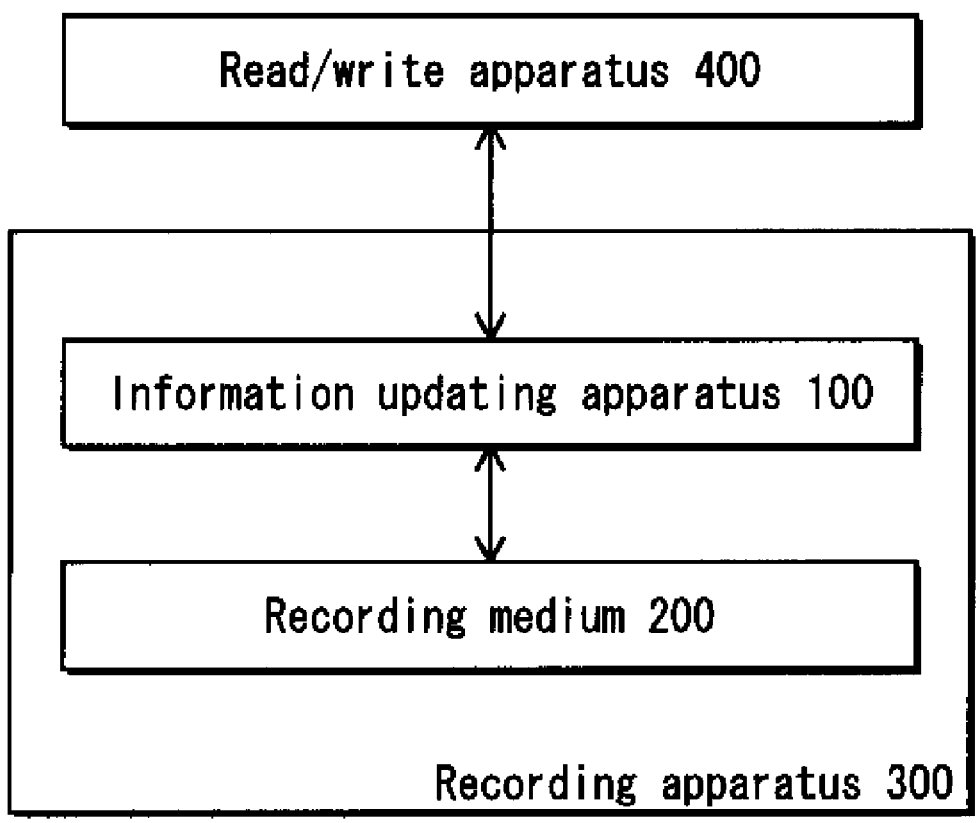
FIG. 1 shows a structural diagram of an entire system including an information updating apparatus of the present invention.

Firstly, FIG. 1 is a block diagram showing a structure of an entire system for updating the information elements recorded in the recording medium with use of the information updating apparatus of the present embodiment.

In the present embodiment, a read/write apparatus 400 reads data from and writes data into a recording apparatus 300 including an information updating apparatus 100 and a recording medium 200.

The recording apparatus 300 is a non-volatile semiconductor memory, a representative example of which is an SD memory card, or a LSI (Large Scale Integration) including EEPROM (Electrically Erasable and Programmable Read Only Memory). The recording medium 200 is a non-volatile flash memory. The information updating apparatus 100 is an LSI that writes information elements recorded in the recording medium 200 and reads the written information elements, in accordance with commands transmitted from the read/write apparatus 400.

Figure 2:
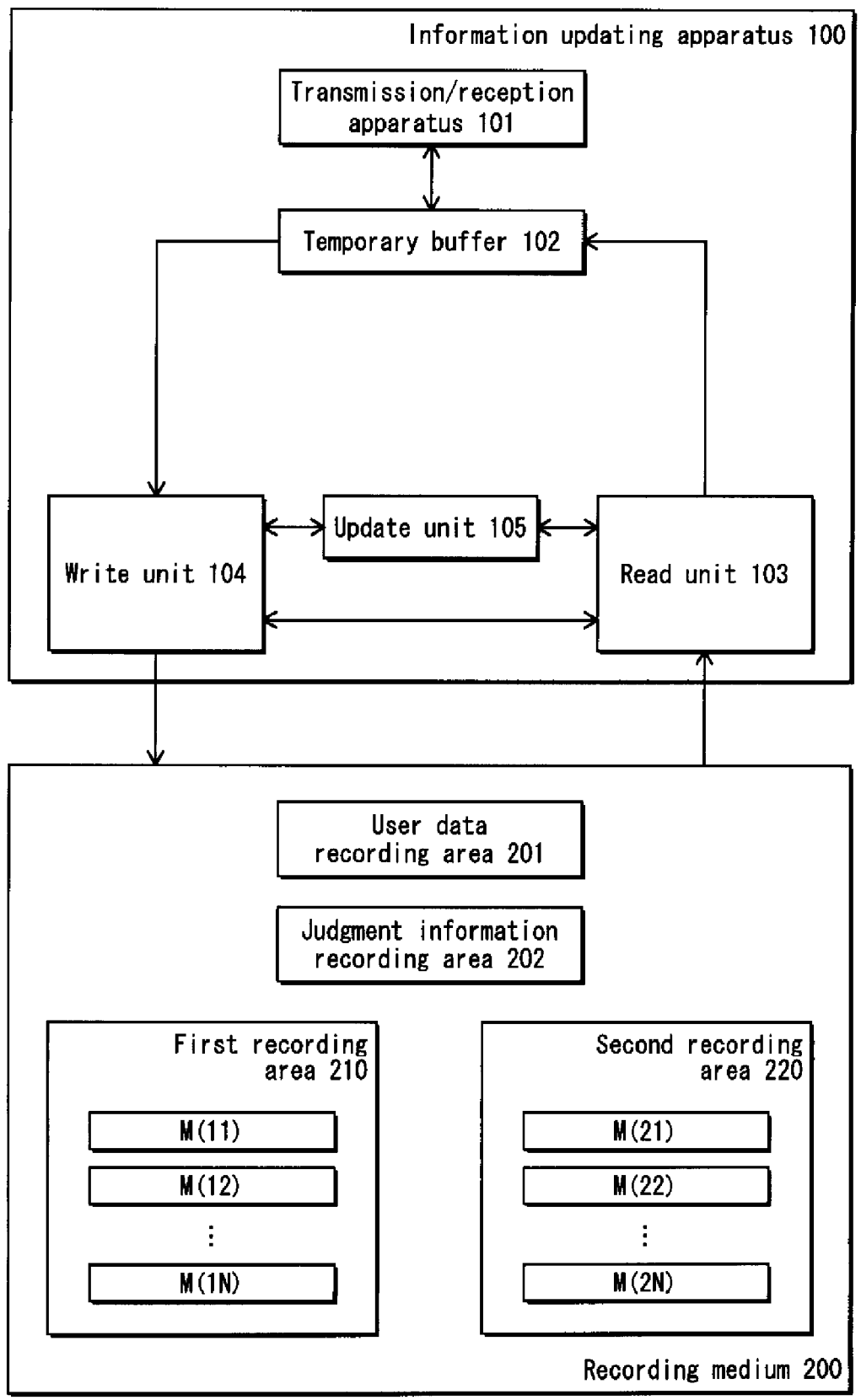
FIG. 2 shows a structural diagram of the information updating apparatus in a first embodiment.

FIG. 2 is a block diagram showing a structure of the information updating apparatus 100 and a structure of the recording medium 200 in the present embodiment.

N recording areas that belong to a first recording area 210 are allocated in the recording medium 200. Also, N recording areas that belong to a second recording area 220 are allocated in the recording medium 200. N information elements are allocated in the recording areas that belong to each of the first and second recording area. The N information elements are to be updated with the robustness against power discontinuity ensured. Also, a judgment information recording area 202 is allocated in the recording medium. Judgment information D is recorded in the judgment information recording area 202. The judgment information D indicates either one of the first recoding area 210 and the second recording area 220 as a writable recording area. Here, the writable recording area is a recording area into which the N information elements are to be written. Here, the judgment information D is a one-bit flag. When D=0, the first recording area 210 is the writable recording area, and the second recording area 220 is a readable recording area. Here, the readable recording area is a recording area from which the N information elements are to be read. When D=1, the second recording area 220 is the writable recording area, and the first recording area 210 is the readable recording area. Furthermore, a user data recording area 201 is allocated. Information elements recorded in the user data recording area 201 do not have to be updated with the robustness against power discontinuity ensured.

Addresses in the recording medium 200 are managed with use of a paging system. The first recording area 210 and the second recording area 220 are allocated in different pages from one another.

FIGS. 3A, 3B, 3C and 3D show address tables for managing the first recording area 210 and the second recording area 220.

As shown in FIG. 3A, a page number and an area number are uniquely allocated to each of recording areas M(11), M(12), . . . , and M(1N) and recording areas M(21), M(22), . . . , and M(2N). Here, the recording areas M(11), M(12), . . . , and M(1N) belong to the first recording area 210, and the recording areas M(21), M(22), . . . , and M(2N) belong to the second recording area 220. Each of the recording areas is expressed as M(Wn). Here, a variable W indicates either group of the recording areas indicated as the writable recording area and a variable n indicates a number of each recording area.

Start addresses of pages are managed in a table included in the recording medium 200, as shown in FIG. 3B. The start addresses of pages are in one-to-one correspondence with page numbers.

In each page, start addresses of the recording areas are managed in a table as shown in FIG. 3C. An area number of each recording area is in correspondence with a size of the recording area and a start offset indicating an offset from a page start address of the recording area.

Figure 4:
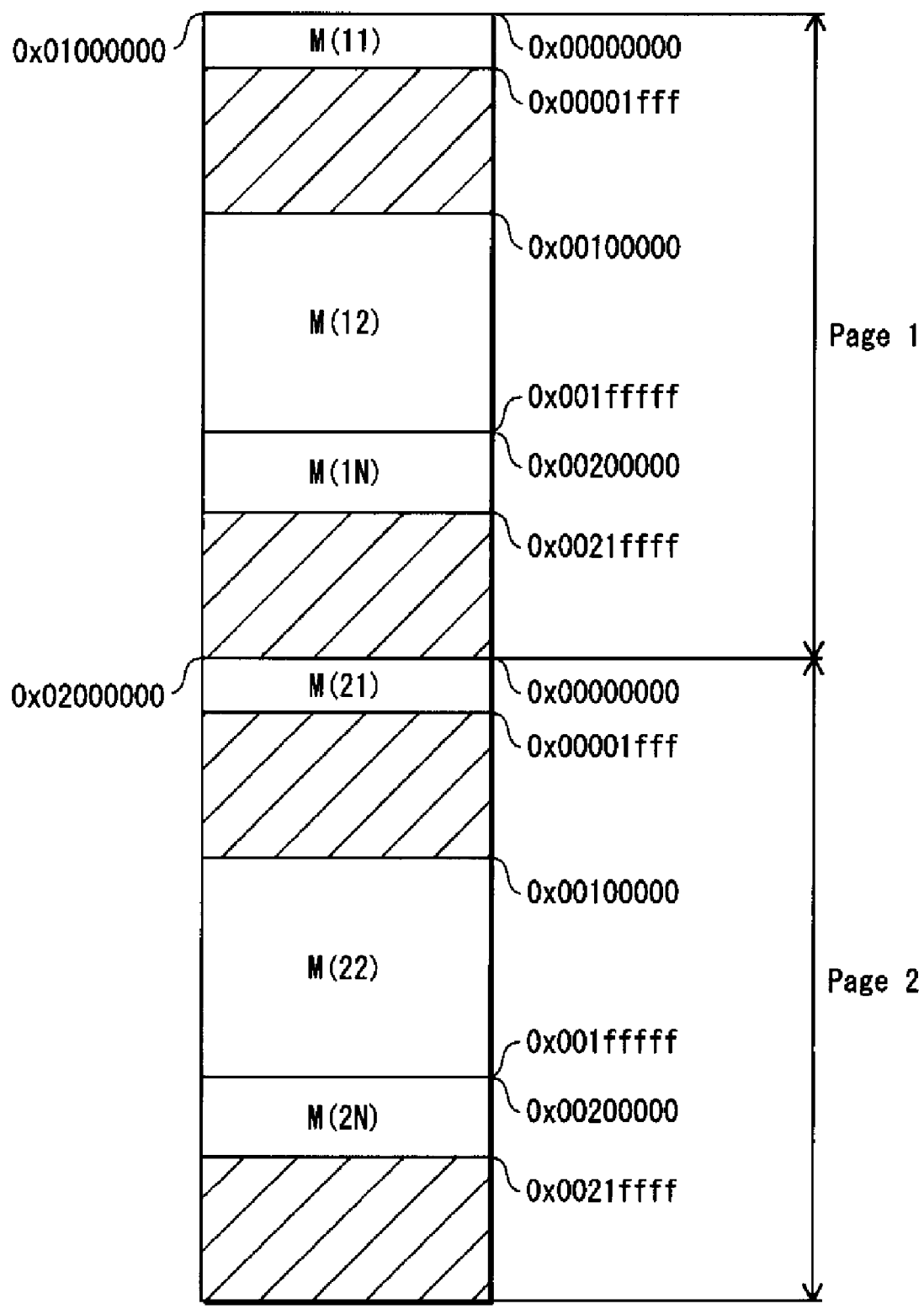
FIG. 4 shows an address map of the recording areas allocated in the recording medium in the first embodiment.

According to the above-described tables, start addresses and end addresses of the recording areas M(11), M(12), . . . , and M(1N) and the recording areas M(21), M(22), . . . , and M(2N) are as shown in a table in FIG. 3D. Here, the recording areas M(11), M(12), . . . , and M(1N) belong to the first recording area 210 and the recording areas M(21), M(22), . . . , and M(2N) belong to the second recording area 220. An address map version of this table is illustrated in FIG. 4.

The following describes a structure of the information updating apparatus 100.

The information updating apparatus 100 is composed of a transmission/reception unit 101, a temporary buffer 102, a read unit 103, a write unit 104 and an update unit 105.

The transmission/reception unit 101 has functions of receiving a write command and a read command from the read/write apparatus 400, and transmitting and receiving the information elements recorded in the recoding medium 200. Upon each reception of the write command from the read/write apparatus 400, the transmission/reception unit 101 receives the information element to be written into the recording area and stores the received information element in the temporary buffer 102. Also, upon each reception of the read command from the read/write apparatus 400, the transmission/reception unit 101 reads, via the read unit 103, the information element stored in the temporary buffer 102 and transmits the read information element to the read/write apparatus 400.

The temporary buffer 102 is a volatile memory that temporarily stores therein the information elements. The information elements received from the read/write apparatus 400 and the information elements to be transmitted to the read/write apparatus 400 are stored in the temporary buffer 102. Also, the information elements read from the recording medium 200 and the information elements to be written into the recording medium 200 are also stored in the temporary buffer 102.

The read unit 103 has a function of reading the information elements recorded in the recording medium 200. The read unit 103 reads the judgment information D recorded in the judgment information recording area 202. Subsequently, the read unit 103 reads each information element from a recording area that belongs to a group of the recording areas indicated, by the judgment information D, as a recording area into which the information element is not to be written (i.e. the readable recording area). Then, the read unit 103 outputs the read information elements to the temporary buffer 102.

The write unit 104 has a function of writing the information elements in the recording medium 200. The write unit 104 receives the judgment information D that has been read by the read unit 103 and is recorded in the judgment information recording area 202. Then, the write unit 104 writes, in recording areas that belong to either group of the recording areas indicated by the judgment information D as the writable recording area, the information elements stored in the temporary buffer 102.

Upon receiving a write completion notification from the write unit 104, the update unit 105 reads the judgment information D recorded in the judgment information recording area 202 via the read unit 103. Then, the update unit 105 instructs the write unit 104 to invert a value indicated by the judgment information D and write the inverted value in the judgment information recording area 202. Here, when the value indicated by the judgment information D is 0 (D=0), a value obtained by inverting such a value is 1 (D=1). When the value indicated by the judgment information D is 1 (D=1), on the other hand, a value obtained by inverting such a value is 0 (D=0).

Information Updating Operations

The following describes the operations of the information updating apparatus 100 in the present embodiment.

The information updating apparatus 100 updates N specific information elements with the robustness against power discontinuity ensured, and updates other information elements without the robustness against power discontinuity ensured.

Figure 5:
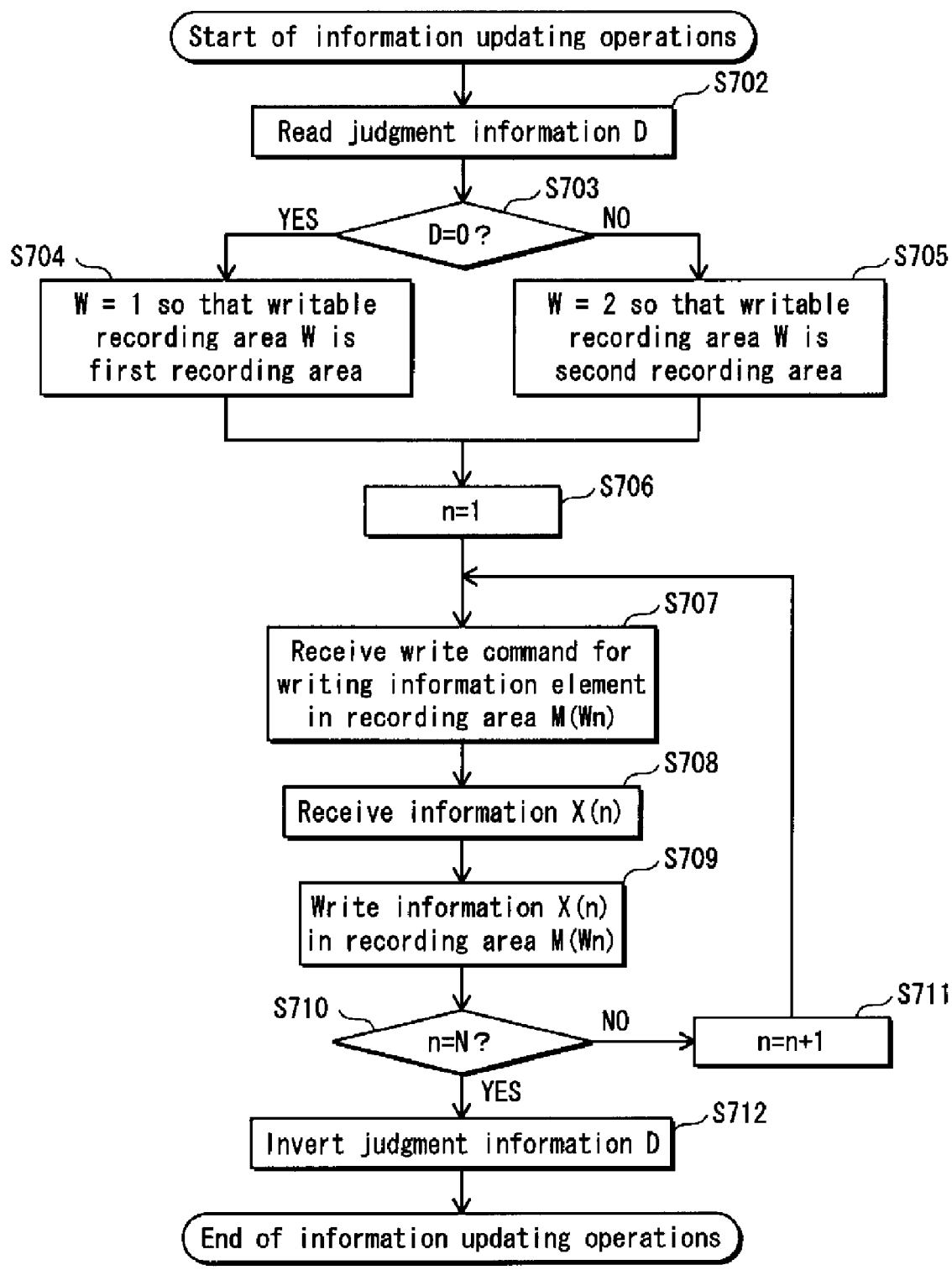
FIG. 5 shows a flowchart showing information updating operations of the information updating apparatus in the first embodiment.

Firstly, the following describes, with reference to FIG. 5, information updating operations for updating the N specific information elements with the robustness against power discontinuity ensured.

Upon receiving an update command indicating a start of the information updating operations from the read/write apparatus 400, the information updating apparatus 100 performs the following operations.

Firstly, the read unit 103 reads the judgment information D recorded in the judgment information recording area 202 (S702). When the judgment information D is 0 (D=0) (S703 Y), the information updating apparatus 100 sets W to 1 (W=1) so that the writable recording area is the first recording area 210 (S704). Also, when the judgment information D is not 0 (S703 N), the information updating apparatus 100 sets W to 2 (W=2) so that the writable recording area is the second recording area 220 (S705).

Next, the write unit 104 performs initialization such that a variable n indicating a number of the recording area is one (S706). Subsequently, the transmission/reception unit 101 receives a write command for writing the information element into an $n^{th}$ recording area M(Wn) from among recording areas that belong to the writable recording area (S707).

Subsequently, the transmission/reception unit 101 receives an information element X(n) to be written into the recording area M(Wn) (S708), and stores the received information element X(n) in the temporary buffer 102. The write unit 104 writes, in the recording area M(Wn), the information element X(n) stored in the temporary buffer 102 (S709). That is, the write unit 104 writes the information element X(n) in addresses indicating the recording area M(Wn) with reference to the address tables shown in FIGS. 3A, 3B, 3C and 3D.

Until the variable n indicating the number of the recording area matches the number N of recording areas (S710 N), the write unit 104 repeats the above-described processing while incrementing the variable n (S711).

Upon completion of writing all the information elements in the N recording areas (S710 Y), the write unit 104 notifies the update unit 105 of the completion. Upon receiving the notification, the update unit 105 reads the judgment information D via the read unit 103 and instructs the write unit 104 to write the value obtained by inverting the value indicated by the judgment information D in the judgment information recording area 202. That is, the write unit 104 writes, in the judgment information recording area 202, 1 (D=1) if D=0, and 0 (D=0) if D=1 (S712).

This completes the information updating operations of updating the N specific information elements with the robustness against power discontinuity ensured.

The following describes information updating operations of updating other information elements except for the N specific information elements without the robustness against power discontinuity ensured.

When the other information elements are updated without the robustness against power discontinuity ensured, a write command "write U" is adopted that is different from the write command used for updating the N specific information elements with the robustness against power discontinuity ensured. When the transmission/reception unit 101 receives the write command "write U", the write unit 104 writes a subsequently-received information element in the user data recording area 201.

Example of Information Updating Operations

The following describes, with reference to FIGS. 6A, 6B, 6C and 6D and FIG. 7, operations of the information updating apparatus 100 for updating the information elements with the robustness against power discontinuity ensured.

Bold frames in FIGS. 6A, 6B, 6C and 6D show the following. When D=0, the first recording area 210 is the writable recording area. When D=1, the second recording area 220 is the writable recording area.

Firstly, FIG. 6A shows that the judgment information D is 0 (D=0), and the recording areas M(11), M(12), . . . , and M(1N) that belong to the first recording area 210 are the writable recording area. Information elements Y(1), Y(2), . . . , and Y(N) before the update are recorded in the recording areas M(21), M(22), . . . , and M(2N) that belong to the second recording area 220.

Figure 7:
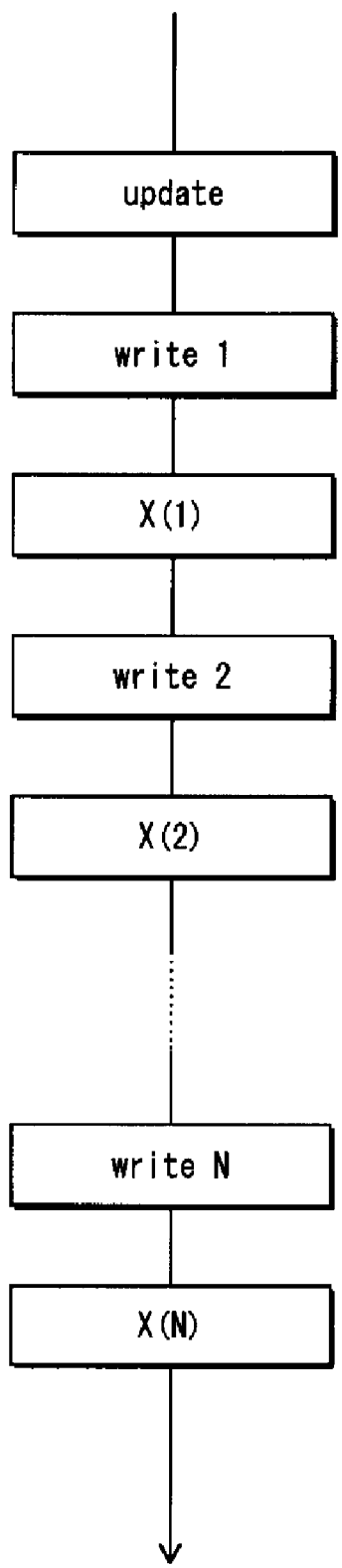
FIG. 7 shows a reception command used in the information updating operations of the information updating apparatus in the first embodiment.

In order to update the information elements Y(1), Y(2), . . . , and Y(N) to information elements X(1), X(2), . . . , and X(N), the read/write apparatus 400 transmits a command shown in FIG. 7 to the information updating apparatus 100. That is, firstly, the read/write apparatus 400 transmits the update command "update" to the information updating apparatus 100. Next, the read/write apparatus 400 transmits, to the information updating apparatus 100, a write command "write 1" for writing the information element into a first recording area. Then, the information updating apparatus 100 transmits, to the information updating apparatus 100, the information element X(1). Furthermore, the read/write apparatus 400 transmits, to the information updating apparatus 100, a write command "write 2" for writing the information element into a recording area that belongs to the second recording area 220. Then, the read/write apparatus 400 transmits, to the information updating apparatus 100, the updated information element X(2). As with the above, the read/write apparatus 400 transmits, to the information updating apparatus 100, a write command "write N" for writing the information element into an $N^{th}$ recording area. Then, the read/write apparatus 400 transmits, to the information updating apparatus 100, the updated information element X(N).

Upon receiving the above-described commands, the information updating apparatus 100 updates the received information elements in the following way.

Firstly, when the transmission/reception unit 101 receives the write command "write 1" and the updated information element X(1), the information element X(1) is stored in the temporary buffer 102. The write unit 104 reads the information element X(1) from the temporary buffer 102, and writes the information element X(1) into the recording area M(11) that belongs to the first recording area 210 indicated by the judgment information D as the writable recording area. FIG. 6B shows a usage state of the recording areas in such a case.

Furthermore, when the transmission/reception unit 101 receives the write command "write 2" and the updated information element X(2), the information element X(2) is stored in the temporary buffer 102. The write unit 104 reads the information element X(2) from the temporary buffer 102, and writes the information element X(2) in the recording area M(12) that belongs to the first recording area 210 indicated by the judgment information D as the writable recording area. FIG. 6C shows a usage state of the recording areas in such a case.

As with the above, when the transmission/reception unit 101 receives the write command "write N" and the updated information element X(N), the information element X(N) is stored in the temporary buffer 102. The write unit 104 reads the information element X(N) from the temporary buffer 102, and writes the information element X(N) into the recording area M(1N) that belongs to the first recording area 210 indicated by the judgment information D as the writable recording area.

The write unit 104 starts counting the number of times the information elements have been written into the recording areas after receiving the update command. When the number of times the information elements have been written into the recording areas matches the fixed number N, the write unit 104 notifies the update unit 105 that the number of times the information elements have been written into the recording areas has reached the fixed number N. Upon receiving the notification, the update unit 105 instructs the read unit 104 to write 1 into the judgment information recording area 202 (D=1). Here, 1 is a value obtained by inverting a value 0 that is indicated by the judgment information D (D=0) that has been read via the read unit 103. In this way, the writable recording area switches from the first recording area 210 to the second recording area 220. FIG. 6D shows a usage state of the recording areas in such a case.

Second Embodiment

A second embodiment describes an information updating apparatus that updates two information elements that are related to one another and recorded in a recording medium, with the robustness against power discontinuity ensured. Specifically, the information updating apparatus judges whether the two information elements are related to one another, and updates the information elements only when judging that the information elements are related to one another.

The two information elements that are related to one another are data Ke(P), and a decryption key Kd for decrypting the data Ke(P). Here, the data Ke(P) is obtained by encrypting a program P with use of an encryption key Ke. The program P includes a digital signature for performing the verification of the decryption key Kd.

The information updating apparatus reads the program P from the recording medium and executes the program P so as to allow transmission and reception of encrypted information elements between the information updating apparatus and the read/write apparatus.

Structure

Figure 8:
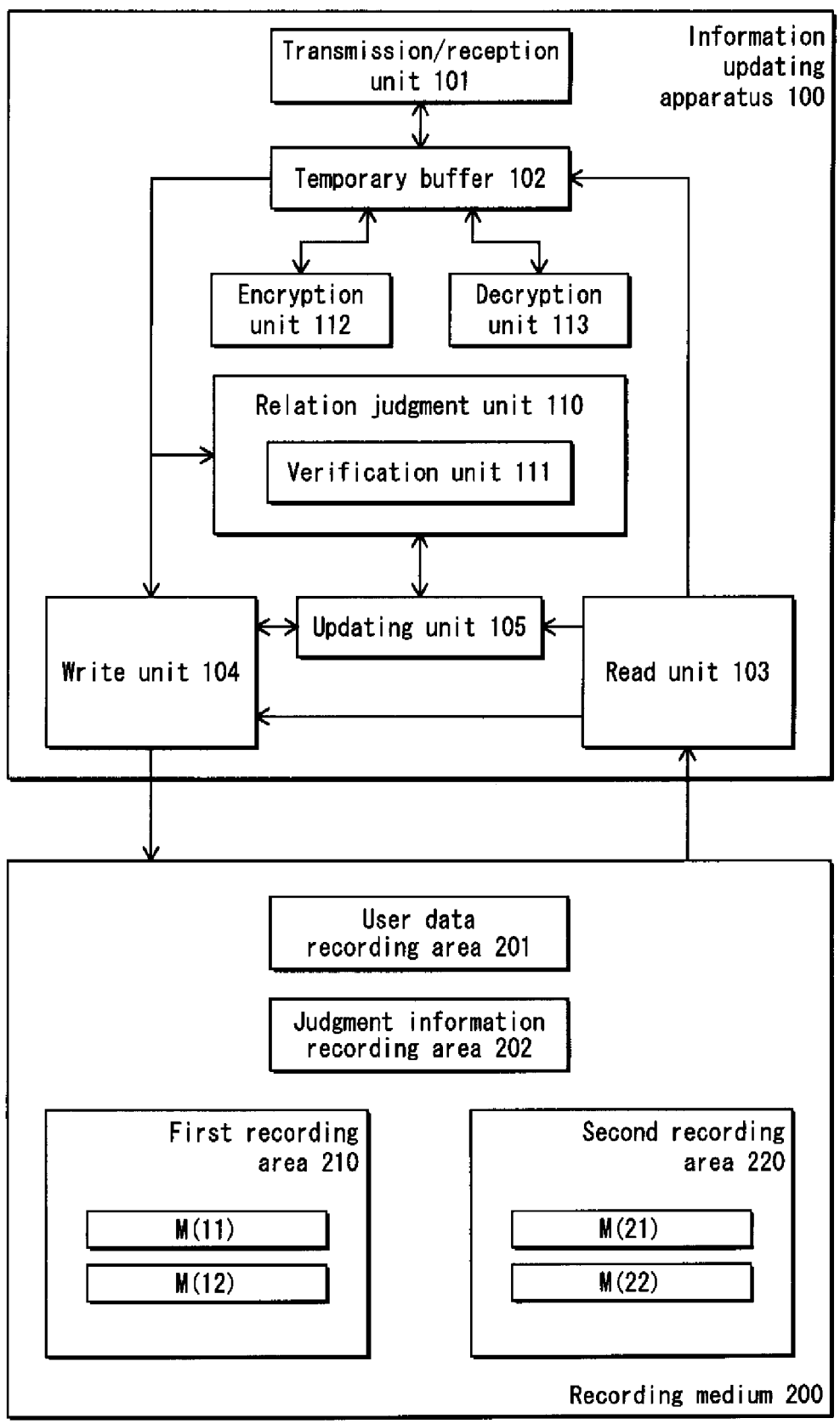
FIG. 8 shows a structural diagram of the information updating apparatus in a second embodiment.

FIG. 8 shows a block diagram showing a structure of the information updating apparatus 100 and the recording medium 200 in the present embodiment.

The information updating apparatus 100 in the present embodiment includes additional elements besides the elements of the information updating apparatus 100 in the first embodiment. Here, the additional elements are an encryption unit 112, a decryption unit 113 and a relation judgment unit 110. Since the elements of the information updating apparatus 100 in the present embodiment except for the additional elements are the same as the elements in the first embodiment, the descriptions thereof are omitted. Also, since the recording areas included in the recording medium 200 in the present embodiment are the same as those in the first embodiment, the descriptions thereof are omitted.

The encryption unit 112 has functions of reading an information element from the temporary buffer 102, encrypting the read information element and writing the encrypted information element into the temporary buffer 102. Here, the encryption unit 112 performs the encryption with use of AES-CBC cipher algorithm. Since the AES-CBC cipher algorithm is known technology, the description thereof is omitted. The encryption unit 112 stores therein a pre-set key K, and performs encryption processing with use of a specified key (the key K or another key externally obtained). That is, when performing the encryption to increase confidentiality of information elements to be written into the recoding areas, the encryption unit 112 performs the encryption with use of the key K stored in the encryption unit 112. On the other hand, in a case where the information updating apparatus 100 and the read/write apparatus 400 generate SAC (Secure Authentication Channel) based on the CPRM standard when the information updating apparatus 100 transmits the information element to the read/write apparatus 400, the encryption unit 112 performs the encryption with use of a common session key Ks used for the encryption using the SAC.

The decryption unit 113 has functions of reading the encrypted information element from the temporary buffer 102, decrypting the read information element, and writing the decrypted information element in the temporary buffer 102. The decryption unit 113 performs the decryption with use of the AES-CBC cipher algorithm as with the encryption unit 112. The decryption unit 113 stores therein the key K for decrypting the information element that has been encrypted with use of the key K. The decryption unit 113 performs the decryption with use of a specified key (the key K or another key externally obtained). That is, when reading, from the recording area, the information element that has been encrypted with use of the key K stored in the encryption unit 112, the decryption unit 113 performs the decryption with use of the key K stored in the decryption unit 113. On the other hand, in a case where the information updating apparatus 100 and the read/write apparatus 400 generate the SAC when the information updating apparatus 100 receives the information element from the read/write apparatus 400, the decryption unit 113 performs the decryption with use of the common session key Ks used for the encryption using the SAC. When decrypting the program P encrypted with use of the encryption key Ke, the decryption unit 113 performs the decryption with use of a decryption key Kd.

The relation judgment unit 110 has a function of judging whether the information elements recorded in the recording areas are related to one another. The relation judgment unit 110 includes a verification unit 111 for performing the verification of the decryption key Kd with use of the digital signature included in the program P. A certificate defined by X.509 is adopted as a standard of the digital signature. Also, the RSA signature verification algorithm is used as specific scheme of the signature verification. Since X.509 and RSA are known technology, descriptions thereof are omitted.

Information Updating Operations

Figure 9:
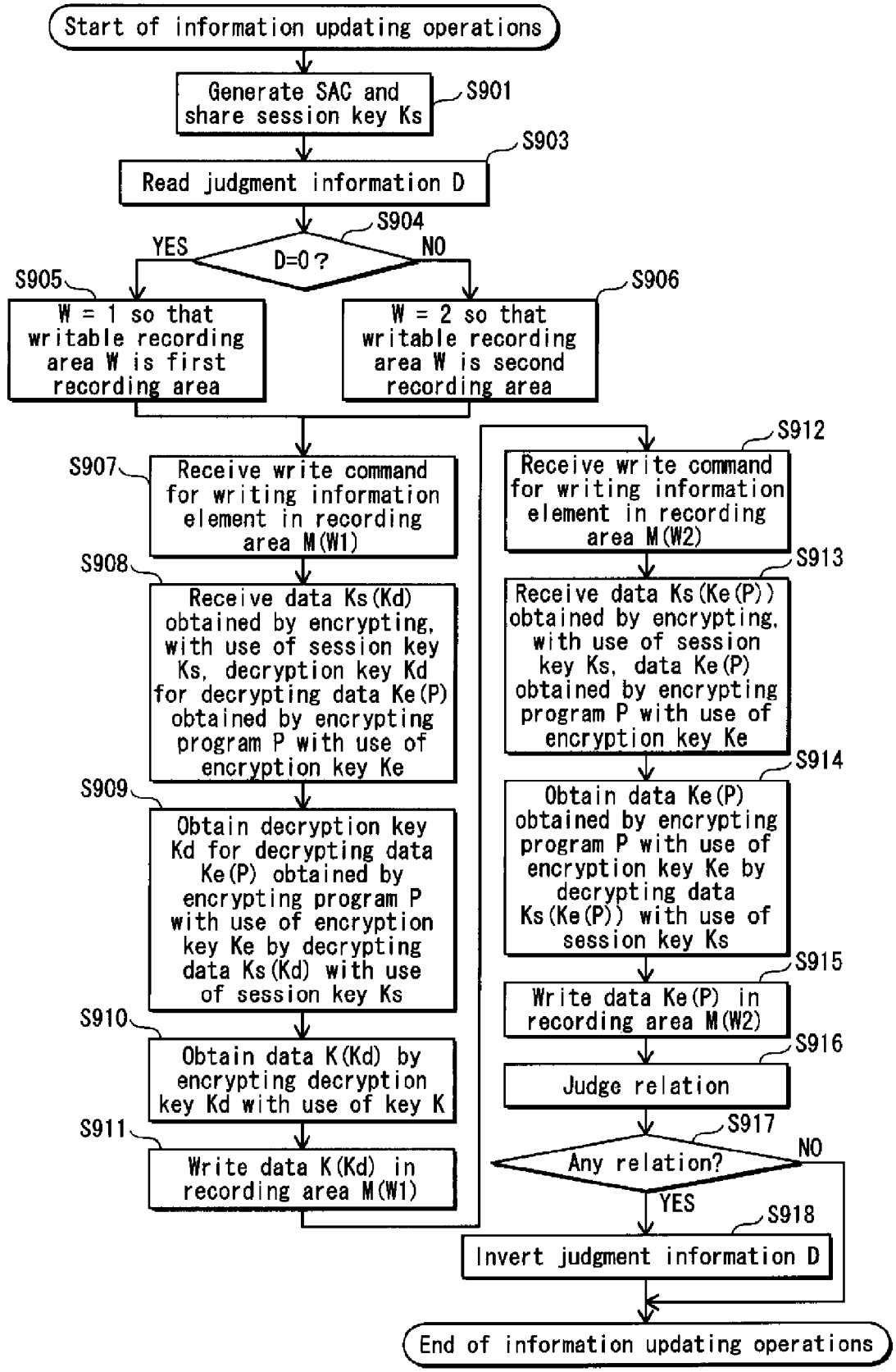
FIG. 9 shows a flowchart showing the information updating operations of the information updating apparatus in the second embodiment.

The following describes operations of the information updating apparatus 100 in the present embodiment with reference to FIG. 9.

Upon receiving, from the read/write apparatus 400, an update command indicating a start of information updating operations, the information updating apparatus 100 performs the following operations.

Firstly, the information updating apparatus 100 and the read/write apparatus 400 generate the SAC based on the CPRM standard, and share the common session key Ks (S901). Since a method for sharing the session key Ks based on the CPRM standard is known technology, a description thereof is omitted.

Subsequently, the read unit 103 reads the judgment information D recorded in the judgment information recording area 202 (S903). When the judgment information D is 0 (D=0) (S904 Y), the information updating apparatus 100 sets W to 1 (W=1) so that the writable recording area is the first recording area 210 (S905). Also, when the judgment information D is not 0 (S904 N), the information updating apparatus 100 sets W to (W=2) so that the writable recording area is the second recording area 220 (S906).

Subsequently, the write unit 104 receives, via the transmission/reception unit 101, a write command for writing the information element into a first recording area M(W1) from among recording areas that belong to the writable recording area (S907). Then, the transmission/reception unit 101 receives data Ks(Kd) obtained by encrypting the decryption key Kd with use of the session key Ks (S908), and stores the data Ks(Kd) in the temporary buffer 102. Here, the decryption key Kd is used for decrypting the data Ke(P) obtained by encrypting the program P with use of encryption key Ke.

Subsequently, the decryption unit 113 obtains the decryption key Kd (S909) by decrypting the data Ks(Kd) stored in the temporary buffer 102 with use of the session key Ks. Then, the decryption unit 113 stores the decryption key Kd in the temporary buffer 102.

Next, the encryption unit 112 obtains data K(Kd) by encrypting the decryption key Kd stored in the temporary buffer 102 with use of the key K (S910). Then, the encryption unit 112 stores the data K(Kd) in the temporary buffer 102.

Next, the write unit 104 writes, in the recording area M(W1), the data K(Kd) stored in the temporary buffer 102 (S911).

Furthermore, the write unit 104 receives another write command for writing an information element into a recording area M(W2) that belongs to the second recording area 220 (S912) from among the recording areas that belong to the writable recording area. Subsequently, the transmission/reception unit 101 receives the data Ks(Ke(P)) obtained by encrypting the data Ke(P) with use of the session key Ks (S913). Then, the transmission/reception unit 101 stores the data Ks(Ke(P)) in the temporary buffer 102.

Next, the decryption unit 113 obtains the data Ke(P) by decrypting the data Ks(Ke(P)) stored in the temporary buffer 102 with use of the session key Ks (S914). Then, the decryption unit 113 stores the data Ke(P) in the temporary buffer 102.

Subsequently, the write unit 104 writes, in the recording area M(W2), the data Ke(P) stored in the temporary buffer 102 (S915).

Next, the relation judgment unit 110 judges whether the information element recorded in the recording area M(W1) and the information element recorded in the recording area M(W2) are related to one another (S916). When the relation judgment unit 110 judges that the information elements are related to one another (S917 Y), the write unit 104 inverts the value indicated by the judgment information D (S918).

This completes the information updating operations.

Note that when the relation judgment unit 110 judges that the information elements are not related to one another (S917 N), the information updating operations end without the value indicated by the judgment information D being inverted.

Relation Judgment Operations

Figure 10:
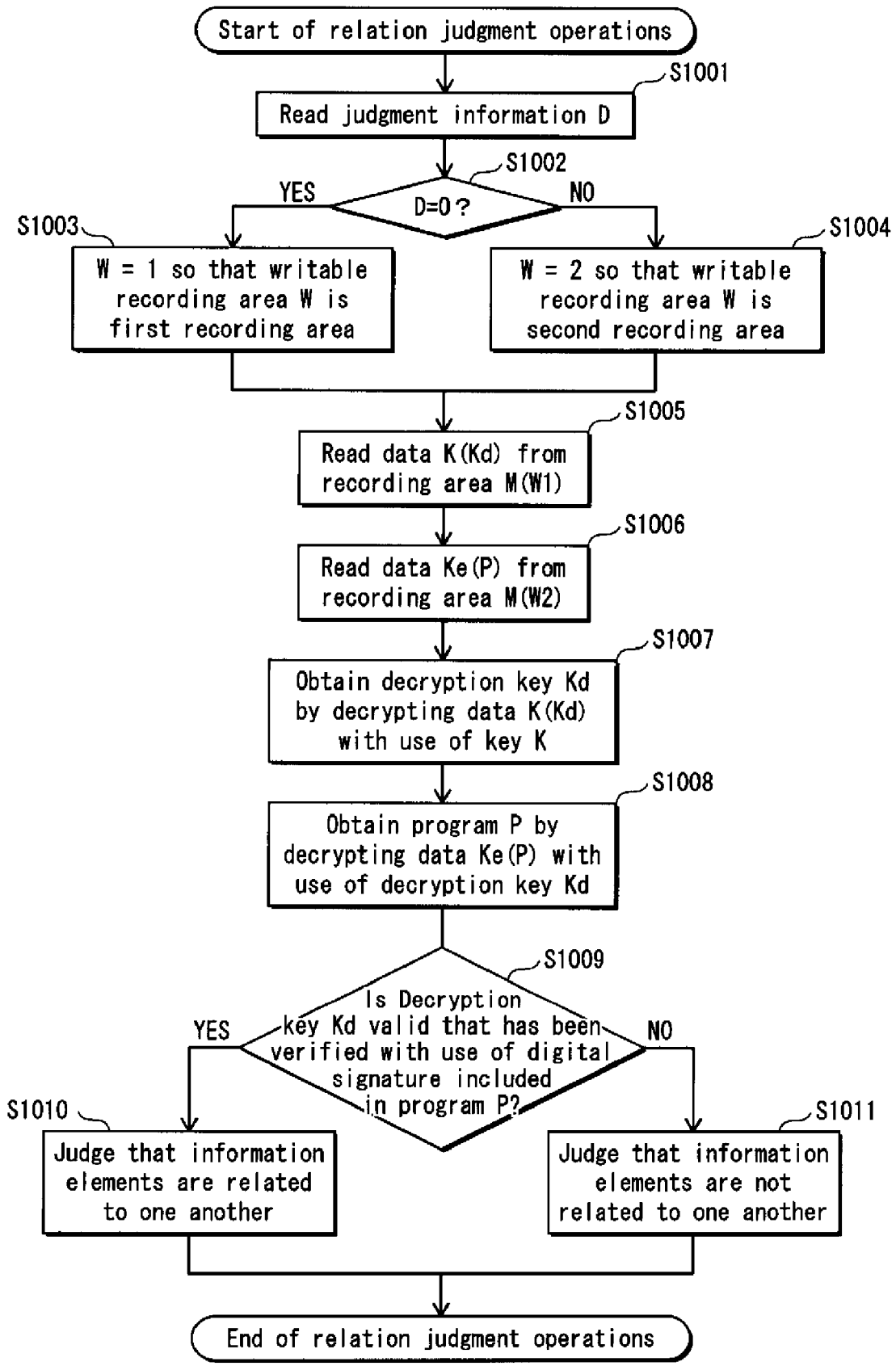
FIG. 10 shows a flowchart showing relation judgment operations of the information updating apparatus in the second embodiment.

The following describes how the relation judgment unit 110 judges whether the information elements recorded in the recording areas are related to one another, with reference to FIG. 10.

Firstly, the read unit 103 reads the judgment information D (S1001). When the judgment information D is 0 (D=0) (S1002 Y), the information updating apparatus 100 sets W to 1 (W=1) so that the writable recording area is the first recording area 210 (S1003). Also, when the judgment information D is not 0 (S1002 N), the information updating apparatus 100 sets W to 2 (W=2) so that the writable recording area is the second recording area 220 (S1004).

Next, the read unit 103 reads the data K(Kd) from the recording area M(W1) (S1005), and stores the read data K(Kd) in the temporary buffer 102. Also, the read unit 103 reads the data Ke(P) from the recording area M(W2) (S1006), and stores the read data Ke(P) in the temporary buffer 102.

Next, the decryption unit 113 obtains the decryption key Kd by decrypting the data K(Kd) stored in the temporary buffer 102 with use of a key K stored in the decryption unit 113 (S1007), and stores the obtained decryption key Kd in the temporary buffer 102.

Furthermore, the decryption unit 113 obtains the program P by decrypting the data Ke(P) stored in the temporary buffer 102 with use of the decryption key Kd (S1008), and stores the obtained program P in the temporary buffer 102.

Next, the relation judgment unit 110 performs verification of the decryption key Kd with use of the digital signature included in the program P stored in the temporary buffer 102 (S1009).

The verification of the decryption key Kd is performed by the following way. That is, data obtained by encrypting the decryption key Kd with use of the encryption key Ke is included in the digital signature in advance. The relation judgment unit 110 extracts the digital signature from data obtained by decrypting the encrypted program P with use of the decryption key Kd. Then, the relation judgment unit 110 compares data with the decryption key Kd received by the information updating apparatus 100 to see if the data matches the decryption key Kd. Here, the data is obtained by decrypting the data included in the extracted digital signature with use of the decryption key Kd. Only when the verification of the decryption key Kd is successful, the obtained data matches the decryption key Kd. In such a way, the verification of the decryption key Kd is performed.

When the verification of the decryption key Kd is successful that has been performed with use of the digital signature included in the program P (S1009 Y), the relation judgment unit 110 judges that the information elements are related to one another (S1010). When the verification of the decryption key Kd is not successful (S1009 N), the relation judgment unit 110 judges that the information elements are not related to one another (S1011).

This completes the relation judgment operations.

Supplementary Remarks

The above-described embodiments may be modified as follows.

(1) The above first embodiment describes the following case. That is, the number N of information elements to be updated has been pre-specified. Upon receiving the update command indicting the start of the information updating operations, the information updating apparatus 100 judges whether all the plurality of updated information elements have been received, by counting the number of received information elements. However, the present invention is not always limited to this case.

For example, the following modification is possible. Each information element has information indicating a group to which it belongs. Each time the information element is received, a group to which the information element belongs is analyzed. Upon completion of receiving information elements that belong to the predetermined group, it is judged that all of a plurality of new information elements have been received. In the above-described first embodiment, it is judged whether the reception of the information elements is completed, by counting the number of information elements. Alternatively, in the present modification, it is possible to judge whether the reception of all the information elements is completed by judging whether the group to which each information element belongs matches the predetermined group.

Also, it is possible to judge whether the reception of all of the plurality of new information elements is completed when a predetermined command is transmitted from the read/write apparatus 400. This can be realized by sending a command indicating completion of transmitting all the information elements after such transmission has been finished. This is similar to the case where the read/write apparatus 400 transmits the update command at the start of information updating operations.

(2) The above second embodiment describes the following case. That is, it is judged whether the information elements recorded in the recording areas are related to one another after the information elements have been written into the recording areas that belong to the writable recording area. Alternatively, the following modification is possible. That is, it is judged whether the information elements are related to one another before writing of the information elements. Only when the information elements are related to one another, the information elements are written into the recording areas.

This can be realized by taking the following steps. While the temporary buffer 102 stores therein the information elements to be written into the recording areas, the relation judgment unit 110 judges whether the information elements stored in the temporary buffer 102 are related to one another. Only when the information elements are related to one another, the relation judgment unit 110 instructs the write unit 104 to write the information elements in the recording areas.

In such a way, without needing to make unnecessary access to the recording medium 200, it is possible to shorten the amount of time necessary to complete the information updating operations when the information elements are not related to one another. Also, aging deterioration of the recording medium 200 can be suppressed.

(3) The above second embodiment describes the following case. That is, it is judged whether the information elements recorded in the recording areas are related to one another after the information elements have been written into the recording areas that belong to the writable recording area. Alternatively, it is possible to judge whether the information elements are related to one another each time one information element is written.

This can be realized by taking the following steps. The relation judgment unit 110 judges whether the information elements stored in the temporary buffer 102 are related to one another. In parallel with that, the relation judgment unit 110 instructs the write unit 104 to write, in the recording areas, the information elements stored in the temporary buffer 102.

Thus, it is possible to shorten the amount of time necessary to complete the information updating operations.

(4) The above second embodiment describes the case where judgment as to whether the information elements related to one another is made by performing certificate verification with use of X.509. However, the present invention is not always limited to this.

For example, a hash value of the decryption key for decrypting the encrypted program may be used as signature data. In this case, judgment as to whether the information elements are related to one another can be made by taking the following steps. That is, the verification unit 111 compares the hush value of the decryption key with a hush value included in the signature data to see whether these hush values match. Here, the hush value of the decryption key is calculated in the same manner that the hush value included in the signature data is calculated.

Alternatively, part of data obtained by decrypting the encrypted program may be used as the signature data.

In this case, the judgment as to whether the information elements are related to one another may be made as follows. That is, the verification unit 111 compares the part of the data obtained by decrypting the encrypted program with the pre-set fixed value to see whether these values match.

Alternatively, the judgment as to whether the information elements are related to one another may be made as follows. That is, the verification unit 111 compares part of the information element with the pre-set fixed value.

Here, the pre-set fixed value may be a value notified from the read/write apparatus 400. Alternatively, the pre-set fixed value may be a value pre-recorded in a predetermined area in the recording medium 200.

(5) The above second embodiment describes the case where the judgment is made as to whether two information elements are related to one another. Alternatively, judgment may be made as to whether three or more information elements are related to one another. This can be realized by taking the following steps, for example. Three recording areas are allocated in each of the first recording area and the second recording area instead of two recording areas as described in the second embodiment. The judgment as to whether the information elements are related to one another is made after all three information elements have been written into the recording areas.

Also, a case is possible in which only two out of three information elements are judged to be related to one another, and the remaining information element is not judged to be related to the two information elements. All of the information elements do not have to be related to one another as long as at least two information elements are judged to be related to one another.

(6) The above second embodiment describes the case where the relation judgment as to whether the information elements are related to one another is made after the completion of writing all the information elements in the recording areas. However, the present invention is not always limited to this. For example, some of the plurality of information elements may be written before the relation judgment, and the remaining information elements may be written only when these information elements are judged to be related to one another. Specifically, an information element large in volume may be written into the recording area before the relation judgment. An information element small in volume, on the other hand, may be subjected to the relation judgment while stored in the temporary buffer 102. In this case, when it is judged that the information elements are related to one another, the value indicated by the judgment information D is inverted after all the information elements stored in the temporary buffer 102 have been written into the recording areas.

(7) The above second embodiment describes that the transmission and the reception of each information element between the read/write apparatus 400 and the information updating apparatus 100 is performed via the same SAC. However, the present invention is not always limited to this.

For example, SAC may be generated for each information element. In this case, a session key Ks for decrypting each information element received from the read/write apparatus 400 is different.

Alternatively, only one of the information elements may be transmitted and received via the SAC. In this case, from among the information elements received from the read/write apparatus 400, only a specific information element that has been transmitted and received via the SAC needs to be decrypted with use of the session Key Ks. Thus, the other information elements except for the specific information element do not have to be decrypted with use of the decryption key Ks.

(8) The above second embodiment describes that the information elements that are related to one another are the encrypted program and the decryption key used for decrypting the program. However, the present invention is not always limited to this.

For example, the information elements that are related to one another may be a program and setting information for executing the program. In this case, the relation judgment as to whether the information elements are related to one another may be made by taking the following steps. That is, a hush value of the program is included in the setting information. A value is compared with the hush value included in the setting information to see whether the value and the hush value included in the setting information match. Here, the value is obtained by calculating the hush value of the program in the same manner that the hush value included in the setting information is calculated.

Alternatively, the information elements that are related to one another may be portions of data obtained by dividing the data. In this case, the relation judgment as to whether the information elements are related to one another may be made by taking the following steps. That is, a hush value of the data before being divided is embedded in one of the portions of the data. A value is compared with the hush value of the data before being divided to see whether the value and the hush value of the data before being divided match. Here, the value is obtained by calculating a hush value of data composed of the divided portions in the same manner that the hush value of the data before being divided is calculated.

(9) The above embodiments describe that the judgment information is one-bit flag. However, the present invention is not always limited to this. For example, the judgment information may be a numerical value composed of a plurality of bits. In this case, the judgment as to which of the first and second recording areas is the writable recording area is made by judging whether or not the numerical value is a predetermined value.

(10) According to the above embodiments, the judgment information is read after the update command is received, and then the judgment is made as to which of the first and second recording areas is the writable recording area. However, the present invention is not always limited to this. That is, the judgment as to which of the first and second recording areas is the writable recording area may be made before the information elements are actually written. The following case is possible, for example. That is, the judgment information may be read after the first write command is received, and then the judgment is made as to which of the first and second recording areas is the writable recording area. Also, the judgment information may be read after entirety or part of the first information element is received from among the plurality of information elements to be updated. Then, the judgment is made as to which of the first and second recording areas is the writable recording area.

(11) The above embodiments describe that the write unit 104 sequentially writes an information element in each recording area. However, the present invention is not always limited to this. That is, an order of writing the information elements does not matter as long as it is judged whether all the information elements have been written. For example, by connecting a plurality of recording mediums 200 with the information updating apparatus 100, a plurality of information elements can be simultaneously written into the different recording mediums 200.

(12) The above embodiments describe the following case. That is, recording areas that belong to the different groups are allocated in different pages. Each recording area that belongs to the first recording area 210 and a corresponding recording area that belongs to the second recording area 220 have the same offset from a page start address in each page. However, the present invention is not always limited to this. For example, a given recording area that belongs to the first recording area 210 and another recording area that belongs to the second recording area 220 may be allocated in the same page. This can be realized by managing a location of each recording area according to its start address and its size instead of managing the location of each recording area according to the size, the page start address and the offset from the page start address.

(13) The system including the information updating apparatus 100 in the above-described embodiments may be structured as an SD memory card, a USB memory, a kit product including or an LSI, a DVD drive and a DVD-RAM (Digital Versatile Disk Random Access Memory), a kit product including a BD drive, a BD-RE (Blu-ray Disc Rewritable) and an LSI including a built-in EEPROM.

(14) The present invention may include a kit product such as commercial equipment including a system LSI that realizes the information updating apparatus 100 in the above-described embodiment. For example, a circuit board on which the LSI is mounted may be mounted in commercial equipment such as digital TV, a broadcast reception device, an accumulation/reproduction device, a mobile telephone, a digital camera, a digital video camera, an on-vehicle terminal, and an automobile on which the on-vehicle terminal is provided.

(15) According to the above-described embodiments, each of the encryption unit 112 and the decryption unit 113 stores therein the key K. The information element is encrypted and decrypted with use of the key K in order to increase the confidentiality when the information element is written into or read from the recording area. However, the present invention is not always limited to this. For example, the key K may be stored in a confidential area of the recording medium 200 to which the read/write apparatus 400 cannot make access. Also, the key K may be stored after being encrypted in predetermined encryption processing. In this case, the encryption key used for performing the encryption processing is stored in a predetermined area separately. The predetermined area in which the encryption key is stored may be a predetermined area in one of the encryption unit 112, the decryption unit 113 and a predetermined area included in the recording medium 200, for example.

(16) According to the above embodiments, all the information elements received from the read/write apparatus 400 are written into the recording medium. However, the present invention is not always limited to this. That is, some of the information elements received from the read/write apparatus 400 and data obtained by decrypting some of the information elements may be recorded in the recording medium.

(17) According to the above-described embodiments, the first recording area 210 and the second recording area 220 are allocated in areas different from the user data recording area 201. However, the present invention is not always limited to this. That is, a recording area that belongs to the first recording area 210 and a corresponding recording area that belongs to the second recording area 220 may be allocated in areas that have different confidentiality from other recording areas. For example, the recording area M(11) that belongs to the first recording area 210 and the recording area M(21) that belongs to the second recording area 220 may be allocated in areas which the information elements cannot be written into or read from without involving the SAC. The recording area M(12) that belongs to the first recording area 210 and the recording area M(22) that belongs to the second recording area 220 may be allocated in areas which the information elements can be written into and read from normally without involving the SAC.

INDUSTRIAL APPLICABILITY

According to the present invention, it is possible to update a plurality of information elements while ensuring the robustness against power discontinuity. Therefore, the present invention provides an effect that an amount of time necessary for updating can be shorten compared to the conventional technology. According to the present invention, especially in a case where the plurality of information elements are related to one another, it is possible to provide an effect of ensuring that the relation between the information elements is not lost. Here, such loss of the relation is caused due to the information elements before and after the update being mixed up. Therefore, the present invention is useful for a product relating to a semiconductor memory, a representative example of which is an SD card. In addition to such a product, the present invention is useful for a home appliance, a personal computer, or a mobile telephone that have recording areas and update a plurality of information elements.

REFERENCE SIGNS LIST 100 information updating apparatus
101 transmission/reception unit
102 temporary buffer
103 read unit
104 write unit
105 update unit
110 relation judgment unit
111 verification unit
112 encryption unit
113 decryption unit
200 recording medium
201 user data recording area
202 judgment information recording area
210 first recording area
220 second recording area
300 recording apparatus
400 read/write apparatus

The invention claimed is:

1. An information updating apparatus that updates information elements recorded in a non-volatile recording medium, the recording medium including two groups of recording areas that are identical in number, the information updating apparatus comprising:
a hardware processor operable to (i) write, on a one-to-one basis, information elements into one of the two groups of recording areas using judgment information, the judgment information indicating, as target recording areas, the one of the two groups of recording areas into which the information elements are to be written, and (ii) update, each time the processor completes writing of all of the information elements, the judgment information to indicate the other one of the two groups of recording areas as the target recording areas,
wherein, for each of the information elements, the processor writes information pieces that form the information element into an address range corresponding to a different recording area from among the target recording areas, the address range defining a continuous region in an address space.

2. The information updating apparatus of claim 1, wherein the processor is further operable to read information elements from one of the two groups of recording areas that are not indicated as the target recording areas.

3. The information updating apparatus of claim 2, further comprising
wherein the processor is further operable to judge whether two or more information elements are related to one another, and
wherein the processor performs the update only when the processor judges positively that the two or more information elements are related to one another.

4. The information updating apparatus of claim 3,
wherein the processor is further operable to encrypt one or more information elements to be written by the processor, and
wherein the processor is further operable to decrypt encrypted one or more information elements that have been read by the processor.

5. The information updating apparatus of claim 4,
wherein the information elements to be written by the processor include an encrypted program and a decryption key for decrypting the encrypted program,
wherein the encrypted program includes a digital signature for performing verification of the decryption key,
wherein the processor decrypts the encrypted program with use of the decryption key, and
wherein the processor judges positively that the two or more information elements are related to one another only when the verification is successful.

6. The information updating apparatus of claim 3,
wherein the recording medium is a memory that is managed with use of a paging system,
wherein one of the two groups of recording areas are allocated in a different page from a page in which the other one of the two groups of recording areas are allocated,
wherein the one of the two groups of recording areas are in one-to-one correspondence with the other one of the two groups of recording areas, and
wherein a start address of each recording area of the one of the two groups of recording areas and a start address of a corresponding recording area of the other one of the two groups of recording areas have an identical offset from a page start address.

7. The information updating apparatus of claim 3,
wherein the processor performs the judgment whether the two or more information elements are related to one another after the processor has written one or more information elements from among the information elements, and
wherein the processor writes the remaining information elements from among the information elements when a relationship has been judged to exist between information elements recorded on at least two recording areas from among recording areas indicated by the judgment information to be the target recording areas for writing.

8. A recording apparatus comprising a non-volatile recording medium and an information updating apparatus that updates information elements recorded in the recording medium,
the recording medium including two groups of recording areas and having recorded therein judgment information, the two groups of recording areas being identical in number and the judgment information indicating one of the two groups of recording areas, as target recording areas, into which information elements are to be written,
the updating apparatus including:
a hardware processor operable to (i) write, on a one-to-one basis, the information elements into the one of the two groups of recording areas indicated as the target recording areas using the judgment information, and (ii) update, each time the processor completes writing of all of the information elements, the judgment information to indicate the other one of the two groups of recording areas as the target recording areas, wherein, for each of the information elements, the processor writes information pieces that form the information element into an address range corresponding to a different recording area from among the target recording areas, the address range defining a continuous region in an address space.

9. An integrated circuit that updates information elements recorded in a non-volatile recording medium, the recording medium including two groups of recording areas that are identical in number, the information updating apparatus comprising:
  a hardware processor operable to (i) write, on a one-to-one basis, information elements into one of the two groups of recording areas using judgment information, the judgment information indicating, as target recording areas, the one of the two groups of recording areas into which the information elements are to be written, and (ii) update, each time the processor completes writing of all of the information elements, the judgment information to indicate the other one of the two groups of recording areas as the target recording areas,
  wherein, for each of the information elements, the processor writes information pieces that form the information element into an address range corresponding to a different recording area from among the target recording areas, the address range defining a continuous region in an address space.

10. An integrated circuit comprising a non-volatile recording medium, the integrated circuit updating information elements recorded in the recording medium,
  the recording medium including two groups of recording areas and having recorded therein judgment information, the two groups of recording areas being identical in number and the judgment information indicating one of the two groups of recording areas, as target recording areas, into which information elements are to be written, the integrated circuit including:
  a hardware processor operable to (i) write, on a one-to-one basis, the information elements into the one of the two groups of recording areas indicated as the target recording areas using the judgment information, and (ii) update, each time the processor completes writing of all of the information elements, the judgment information to indicate the other one of the two groups of recording areas as the target recording areas,
  wherein, for each of the information elements, the processor writes information pieces that form the information element into an address range corresponding to a different recording area from among the target recording areas, the address range defining a continuous region in an address space.

11. An information updating method that updates information elements recorded in a non-volatile recording medium, the recording medium including two groups of recording areas that are identical in number, the information updating method comprising:
  a write step of writing, on a one-to-one basis, information elements into one of the two groups of recording areas using judgment information, the judgment information indicating, as target recording areas, the one of the two groups of the recording areas into which the information elements are to be written; and
  an update step of, each time the write step completes writing of all of the information elements, updating the judgment information to indicate the other one of the two groups of the recording areas as the target recording areas,
  wherein, for each of the information elements, the writing step writes information pieces that form the information element into an address range corresponding to a different recording area from among the target recording areas, the address range defining a continuous region in an address space.

* * * * *